United States Patent
Klossek

(10) Patent No.: US 12,296,982 B2
(45) Date of Patent: May 13, 2025

(54) TRANSPORT CONTAINER CONVEYOR SYSTEM AND METHOD FOR THE OPTIMIZED OPERATION OF A TRANSPORT CONTAINER CONVEYOR SYSTEM

(71) Applicant: Siemens Logistics GmbH, Nuremberg (DE)

(72) Inventor: Andreas Klossek, Stein-Deutenbach (DE)

(73) Assignee: Siemens Logistics GmbH, Constance (DE)

( * ) Notice: Subject to any disclaimer, the term of this patent is extended or adjusted under 35 U.S.C. 154(b) by 23 days.

(21) Appl. No.: 18/253,643

(22) PCT Filed: Oct. 25, 2021

(86) PCT No.: PCT/EP2021/079458
§ 371 (c)(1),
(2) Date: May 19, 2023

(87) PCT Pub. No.: WO2022/106155
PCT Pub. Date: May 27, 2022

(65) Prior Publication Data
US 2024/0010356 A1     Jan. 11, 2024

(30) Foreign Application Priority Data
Nov. 20, 2020 (EP) .................................... 20208783

(51) Int. Cl.
*B64F 1/36* (2024.01)
*B07C 3/08* (2006.01)
(Continued)

(52) U.S. Cl.
CPC .............. *B64F 1/368* (2013.01); *B65G 43/08* (2013.01); *B07C 3/08* (2013.01); *B07C 5/04* (2013.01); *B65G 2201/0264* (2013.01)

(58) Field of Classification Search
CPC .......... B07C 5/04; B64F 1/368; B65G 43/08; B65G 2203/04; B65G 2201/0264
(Continued)

(56) References Cited

U.S. PATENT DOCUMENTS 7,753,191 B2 * 7/2010 Lykkegaard ............ B64F 1/368
198/502.2
9,919,825 B2 * 3/2018 Ewert ..................... B65B 35/16
(Continued)

FOREIGN PATENT DOCUMENTS

DE    102007025553 A1   12/2008
EP    1645340 A1   4/2006
(Continued)

*Primary Examiner* — James R Bidwell
(74) *Attorney, Agent, or Firm* — Laurence A. Greenberg; Werner H. Stemer; Ralph E. Locher

(57) ABSTRACT

A method for the optimized operation of a transport container conveyor system for items of cargo, in particular of an airport luggage conveyor system, includes: a) introducing an item of cargo into the conveyor system at an introduction point; b) providing larger transport containers of a first category and smaller transport containers of a second category for receiving a respective item of cargo; c) automatically recording a dimension of the item of cargo; d) depending on the recorded dimension, automatically assigning the item of cargo to a transport container of a first or second category; e) automatically loading the assigned transport container with the item of cargo; f) transporting the transport container loaded with the item of cargo on active conveyor sections; g) repeating the above steps for further items of cargo. There is also described a novel conveyor system.

19 Claims, 2 Drawing Sheets

(51) Int. Cl.
*B07C 5/04* (2006.01)
*B65G 43/08* (2006.01)

(58) Field of Classification Search
USPC .............................. 198/502.2; 209/623, 685
See application file for complete search history.

(56) References Cited

U.S. PATENT DOCUMENTS

| | | | |
|---|---|---|---|
| 10,737,818 B2 | 8/2020 | Lau et al. | |
| 2003/0221935 A1* | 12/2003 | Barklin .................. | B65G 47/96 |
| | | | 209/559 |
| 2011/0139582 A1* | 6/2011 | Herrmann .............. | B65G 15/50 |
| | | | 198/572 |
| 2023/0391559 A1* | 12/2023 | Klossek .................. | B65G 47/53 |

FOREIGN PATENT DOCUMENTS

| | | | | |
|---|---|---|---|---|
| EP | 3028774 A1 | 6/2016 | | |
| EP | 4108604 A1 * | 12/2022 | ............... | B07C 5/36 |

* cited by examiner

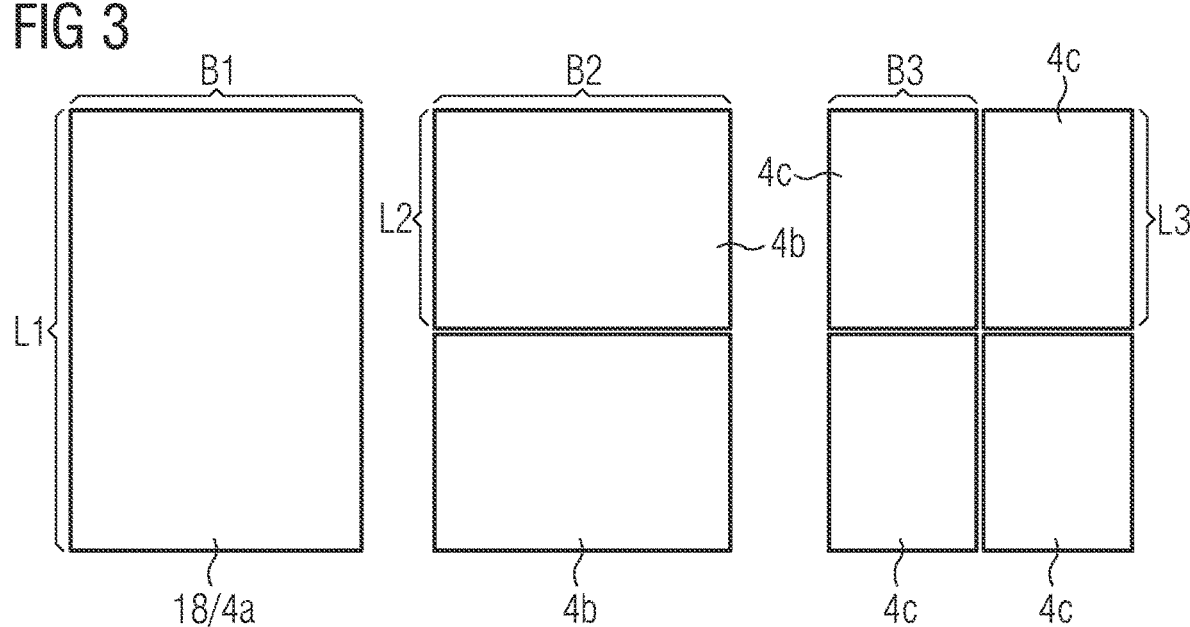
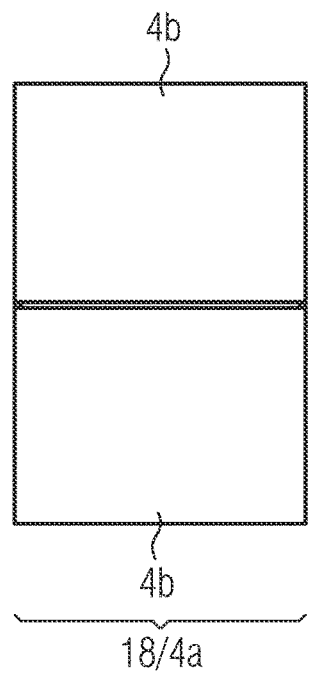
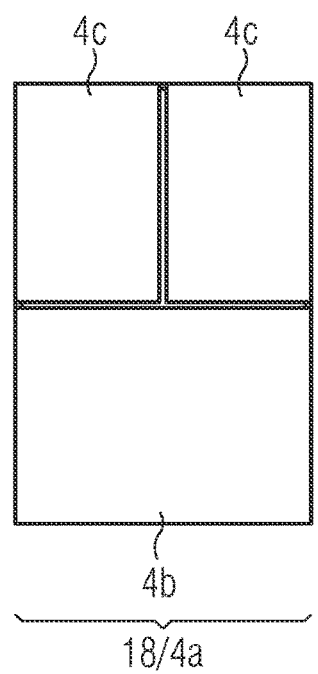
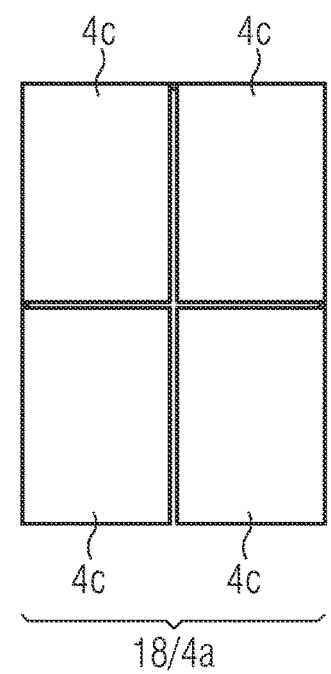

TRANSPORT CONTAINER CONVEYOR SYSTEM AND METHOD FOR THE OPTIMIZED OPERATION OF A TRANSPORT CONTAINER CONVEYOR SYSTEM

FIELD AND BACKGROUND OF THE INVENTION

The present invention relates to the technical field of conveyor systems for piece goods, in particular conveyor systems in which the piece goods are transported in transport containers and, more specifically, airport baggage conveyor systems.

One aim of any airport operator is to operate their baggage conveyor systems as efficiently as possible. The capacity of any baggage conveyor system is limited by the space available on its conveying sections and in its early baggage storage. The larger the transport containers being used, the more space is required.

The transport containers are loaded with items of baggage during or after check-in, usually from above or also from the side. The size of the transport containers is selected depending on the requirements of the airport in such a way that the majority of all items of baggage fit on the selected transport containers. Items of baggage, which exceed the maximum transport container size, are dealt with as bulky baggage. Bulky baggage is manually separated on baggage check-in and dealt with in special bulky baggage transport containers. These bulky baggage transport containers can likewise be transported and processed on some—not all—conveyor systems but are loaded and introduced into the conveyor system and unloaded at different points to the transport containers for normal baggage. The selection of the transport container size used in a baggage conveyor system depends on the requirements of a customer. These requirements are regionally different.

Since the transport container size is defined using the dimension of the largest item of baggage to be conveyed (check-in item of baggage, no bulky baggage), the transport containers are overdimensioned for some of the transport goods and thus at least partially "empty transportation" takes place. A lot of empty space is accumulated in baggage storage.

Better utilization of the existing baggage conveying facilities increases the efficiency thereof, increases the maximum possible throughput, meaning that existing baggage conveying facilities, which reach their limit capacity, can continue to be used without space-, component- and cost-intensive enhancements. New baggage conveying facilities can have a smaller design.

SUMMARY OF THE INVENTION

The present invention is therefore based on the object of providing an improved baggage conveying facility. This object is achieved by a method and a conveyor system having the features of the main claims. Advantageous embodiments of the invention can be found in the subclaims.

The inventive solution relates to a method for optimized operation of a conveyor system for piece goods of variable size in transport containers, in particular for items of baggage of an airport baggage conveyor system, wherein the conveyor system comprises active conveying sections. The method comprises the following method steps:

a) Introducing an item of piece goods into the conveyor system at an introduction point, wherein further piece goods can be introduced into the conveyor system (2) at the same introduction point independently of their dimensions.

b) Providing transport containers of a first and a second category for receiving one item of piece goods respectively, wherein the transport containers of the first category are larger than the transport containers of the second category and the transport containers can be transported on the same active conveying sections of the conveyor system.

c) Automatically recording at least one dimension, preferably a length, of the item of piece goods.

d) As a function of the recorded dimension of the item of piece goods, automatically allocating the item of piece goods to a transport container of the first or second category by way of a background system encompassed by the conveyor system.

e) Transporting the item of piece goods toward a loading station and automatically loading the allocated transport container with the item of piece goods at the loading station.

f) Transporting the transport container loaded with the item of piece goods on the active conveying section(s) toward a sorting destination allocated to the item of piece goods.

g) Carrying out method steps a) to f) for a further item of piece goods.

The transport containers are preferably passive and are transported by the active conveying sections directly or indirectly resting thereon, meaning that the transport containers are inexpensive and do not have to have their own or allocated driving units each comprising active conveying means, such as AGVs. The conveyor system can also be configured to transport further transport containers filled with piece goods (for example transport containers for bulky baggage), it being possible for these transport containers to be introduced into the conveyor system at a different location, but do not have to be. Even if the method is preferably provided for normal baggage as the piece goods, it can also be used for bulky items of baggage or for a mixture of normal and bulky baggage. The piece goods provided for the method can be introduced at the same or at different introduction points. What is critical is that triage of the piece goods provided for the method is still not necessary at the introduction point.

At least two categories of transport container are provided, which are each configured for receiving at least one item of piece goods of corresponding size and the piece goods are automatically allocated, independently of their recorded dimensions, to one of the at least two categories.

The inventive solution is characterized by the non-manual allocation of the item of piece goods to a category of transport containers as a function of the recorded dimensions of the item of piece goods. The space utilization of the transport containers is improved by the provision of transport containers of different sizes and the allocation of the item of piece goods to the appropriate transport container size, that is to say the transport containers of the first or second category; larger transport containers of the first category only have to be used for large piece goods. An item of piece goods allocated to a transport container of the first or second category can also be referred to as an item of piece goods of the first or second category, the same applies to further categories of transport container. The majority of piece goods have smaller dimensions and smaller transport containers (of the second category) have sufficiently large dimensions for these smaller piece goods (of the second category). Nevertheless, it is of course possible in the absence of smaller transport containers (of the second category) to load an item of piece goods of the second category that also fits in terms of its dimensions in a smaller transport container (of the second category) in a transport category of the first category. Of course it is also possible to load small piece goods of the second category with the same sorting destination jointly in one transport container, in a transport container of the second category in the case of very small piece goods or in a transport container of the first category.

The invention is applied in the field of airport baggage conveyor systems but can also be used for other logistics systems such as parcel sorting facilities. The sorting destination can be a particular flight, an early baggage storage in the case of early check-in.

The inventive solution can be improved further by different embodiments that are respectively advantageous in their own right and, unless stated otherwise, can be arbitrarily combined with one another. These configuration and the advantages connected with them will be discussed below.

The spectrum of the transport container categories can, in principle, be arbitrarily expanded, but for optimization reasons the number of transport container categories is to be kept low since return transport and provision with a separate, individual feed of the transport containers of different categories also has to take place.

The item of piece goods allocated to a transport container of the first or second category is referred to as an item of piece goods of the first or second category, meaning that an item of piece goods of the first category is larger in at least one dimension than an item of piece goods of the second category. Of course in the absence of transport containers of the second category, an item of piece goods of the second category can still be loaded in a transport container of the first categories. The size of the smaller transport container (of the second category) determines the maximum permissible dimensions of a (smaller) item of piece goods of the second category. As soon as an item of piece goods is too large to fit in a transport container of the second category it is referred to as an item of piece goods of the first category and is allocated to a transport container of the first category.

The relevant, characterizing external dimensions of the item of piece goods are recorded as the dimensions. With a targeted loading of the transport container with the item of piece goods, the length dimension, in particular, is critical for the allocation of the item of piece goods.

The background system within the meaning of the invention can be integrated in a Supervisory Control and Data Acquisition (SCADA) system in the airport baggage conveyor system, which monitor and control technical processes in airport baggage conveyor systems.

To optimize the method one or more of the method step(s) can be carried out automatically.

According to one embodiment, the following method steps can take place: providing a passive load receiving means dimensioned for receiving at least two transport containers each loaded with at least one item of piece goods and loading the load receiving means with these at least two transport containers, wherein these at least two transport containers are transported on the active conveying section(s) so as to be resting completely or at least partially on the passive load receiving means. The load receiving means is loaded before method step f) is carried out.

The transport containers resting on the passive load receiving means are thus transported indirectly resting on the conveying section. It is possible to operate the method such that all or only some of the transport containers are transported resting on the passive load receiving means. Further transport containers not resting on the load receiving means can be transported directly resting on the conveying section. The passive load receiving means can be configured in many different ways, for example as a pallet.

According to one embodiment, the passive load receiving means can be a transport container of the first category. Thus only smaller transport containers (of the second or higher category) are transported indirectly resting on the conveying sections and the transport containers of the first category are transported directly resting on the conveying sections. The method requires fewer different elements, large transport containers of the first category can be used both for receiving piece goods of the first category and for receiving smaller transport containers, filled with piece goods, of the second (and higher) category.

According to one embodiment, the at least one dimension of the item of piece goods can be recorded with one or more optical sensor(s), for example cameras, light barriers and/or light scanners, with the optical sensor(s) being arranged above and/or along and/or transversely to a direction of movement of the item of piece goods. According to one embodiment, the transport container can be loaded and/or unloaded with the item of piece goods from above and/or from the side.

According to one embodiment, the transport container of the first category can have a first length and a first width and the transport container of the second category can have a second length and a second width, wherein the first length can be greater than or equal to the first width and the second length can be greater than or equal to the second width. The transport containers are thus rectangular or square. The first length can be greater than or equal to the second length and the first width (can be greater than or equal to the second width. A transport container of the second category thus fits on a transport container of the first category. Preferably, the first width is substantially at least one multiple of the second width and/or the first length is substantially at least one multiple of the second length. Space can thus be optimally utilized. The wording "substantially at least one multiple" means that the lengths and/or the widths of the transport containers are dimensioned in order to be adapted to one another in such a way that two or more transport containers, with possibly necessary gaps, fill the length or width of a transport container of the first category.

According to one embodiment, transport containers of a further, third category can also be provided and the inventive method as claimed carried out using the transport containers of the third category, wherein the transport container of the third category is smaller than the transport container of the first category and smaller than or has different dimensions to the transport container of the second category and the inventive method steps can be carried out using the transport containers of the third category, as well as the transport containers of the first and second categories.

According to one embodiment, the dimensions of the transport container of the third category can likewise be advantageously selected and adjusted to the dimensions of the transport containers of the first and second categories. The transport container of the third category can thus have a third width and a third length, wherein the third width can be smaller than or equal to the second width and the third length can be smaller than or equal to the second length. Preferably, the first width can be substantially at least one multiple of the third width and/or the first length can be substantially at least one multiple of the third length. The same can apply to the length and width ratios of the transport containers of the second and third categories.

According to one embodiment, the passive load receiving means can be provided with first holding means and the transport containers with two holding means and the first holding means are configured for interaction, in particular positive-fit interaction, with the second holding means in that the interacting first and second holding means limit a movement of the transport container resting on the passive load receiving means.

According to one embodiment, a transport container can be loaded depending on its category at a loading station of a corresponding category, wherein the loading stations of different categories do not match. Or a transport container can be loaded independently of its category at a shared loading station, wherein the allocated transport container is fed to the shared loading station beforehand. In the second alternative, the conveying paths of the transport containers of different categories do match before loading at their loading station, with this also including only a partial non-match. Separate storage for the transport containers of the first and second categories can thus be arranged close to the loading station, meaning that the transport containers can be provided quickly at the loading station. A shared loading station should be taken to mean a category-independent loading station at which transport containers of the first and second categories equally can be loaded. Thus loading of the transport containers of the first and second categories can be carried out with just one loading apparatus, although a transport container of the correct category, allocated to the item of piece goods, has to be provided selectively at the current instant at the shared loading station.

According to one embodiment, dimensions of the transport containers of the first and/or second category can be defined as a function of a spectrum of piece goods transported on the conveyor system.

According to one embodiment, the transport container (or a plurality of loaded storage containers) loaded with the item of piece goods can be temporarily stored in temporary storage encompassed by the conveyor system, preferably before reaching the (final) sorting destination. The temporary storage acts as an early baggage storage. The piece goods allocated to a particular destination (a particular airplane, a particular distributor vehicle) are temporarily stored, for example stacked, in their transport containers in the temporary storage. In a particularly advantageous embodiment, the temporary storage can be configured for stacking of the transport containers, it being possible in a particularly advantageous embodiment to coordinate the dimensions of the transport containers of the first and second categories in such a way that transport containers of different categories can be stacked on top of one another. The dimensions of the transport containers of the first and second categories can thus be coordinated so, for example, two transport containers of the second category can be stacked on a transport container of the first category. But it is also possible that the transport containers of the first and second categories differ only in their height or that the transport containers of different categories cannot be stacked on top of one another. It is also possible to remove the transport containers individually from a passive load receiving means. However, joint accommodation in temporary storage of all transport containers resting on a load receiving means is also possible, however.

With regard to an apparatus, the above-mentioned object is achieved by a conveyor system for piece goods of variable size in transport containers, comprising means for carrying out the inventive method. The conveyor system has, where transferable, the same advantages which are stated in respect of the presented method.

According to one embodiment, the conveyor system can comprise at least one introduction point for introducing piece goods independently of their dimensions the conveyor system. In addition, the conveyor system can comprise transport containers of a first and a second category configured for receiving one item of piece goods respectively, wherein the transport containers of the first category are larger than the transport containers of the second category. The conveyor system can have active conveying sections for transporting transport containers of the first and second categories, wherein the transport containers can be transported on the same active conveying sections of the conveyor system. The conveyor system can comprise a recording unit for automatically recording at least one dimension, preferably a length, of an item of piece goods, and a background system for automatically allocating the item of piece goods to a transport container of the first or second category as a function of the recorded dimension of the item of piece goods by a background system encompassed by the conveyor system. In addition, a loading station for automatically loading the allocated transport container with the item of piece goods and the active conveying sections can be configured for transporting the transport container loaded with the item of piece goods toward a sorting destination allocated to the item of piece goods.

According to one embodiment, the conveyor system can also comprise passive load receiving means dimensioned for receiving at least two transport container loaded with at least one item of piece goods respectively, wherein the passive load receiving means can be transported resting on the active conveying sections, wherein the passive load receiving means can be a transport container of the first category.

According to one embodiment, the conveyor system can also comprise at least one loading station for loading the transport containers with piece goods, wherein the conveyor system has separate loading stations for each category of transport container, wherein the loading stations of different categories do not match or wherein the at least one loading station is a shared loading station for transport containers of each category.

According to one embodiment, the conveyor system can also comprise transport containers of a further, third category. The dimensions of the transport containers of different categories can be coordinated in the inventive conveyor system analogously to the method.

According to one embodiment, the conveyor system can have a shared loading station, which is configured for loading transport containers of the first and second categories. Loading the transport containers of the first and second categories thus requires only one loading apparatus, although a transport container, allocated to the item of piece goods, of the correct category has to be provided selectively at the correct instant at the shared loading station.

According to a further embodiment, the conveyor system can have a first loading station for loading a transport container of a first category and a second loading station for loading a transport container of a second category, wherein the first and second loading stations do not match. The piece goods therefore have to be transported to the first or second loading station depending on their allocation to a transport container of the first or second category, and this requires two loading apparatuses—if the loading stations are not positioned close to each other. With high volumes of piece goods, a plurality of loading apparatuses is frequently needed anyway, however, for loading all piece goods, meaning that no additional redundancy occurs due to the different loading stations. In addition, the loading apparatus can thus be optimally configured specifically for loading the transport containers of the first or second category.

According to a further embodiment, the conveyor system can have a first and a second feed section for separate feeding of transport containers of the first and second categories to their loading stations.

According to a further embodiment, the conveyor system can have one or more optical sensor(s), for example cameras, light barriers and/or light scanners, with the optical sensor(s) being arranged above and/or along and/or transversely to a direction of movement of the item of piece goods, with the optical sensor(s) being configured to ascertain a dimension of an item of piece goods before loading of the transport containers.

According to a further embodiment, the passive load receiving means can be provided with first holding means and the transport containers with second holding means and the first holding means are configured for interaction, in particular positive-fit interaction, with the second holding means in that the interacting first and second holding means limit a movement of the transport container (resting on the passive load receiving means.

Embodiments of the invention will be explained, by way of example, in more detail below on the basis of the figures. In the drawings:

BRIEF DESCRIPTION OF THE FIGURES

FIG. 3 shows transport containers of different categories;

FIG. 4 shows arrangements of transport containers of different categories on a load receiving means.

DETAILED DESCRIPTION OF THE INVENTION

Figure 1A:
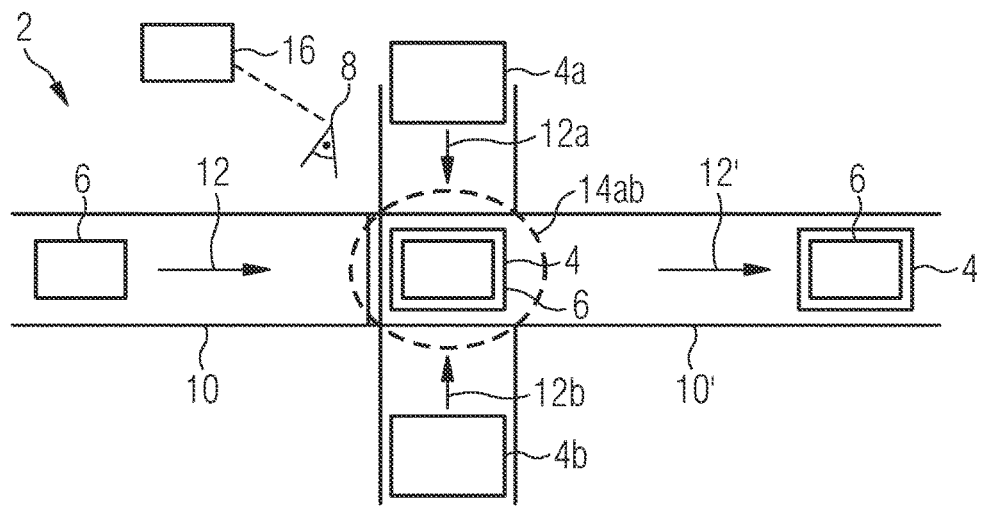
FIG. 1 shows an inventive conveyor system having shared loading station for transport containers of the first and second categories in plan view (FIG. 1a) and in a side view (FIG. 1b)
Figure 1B:
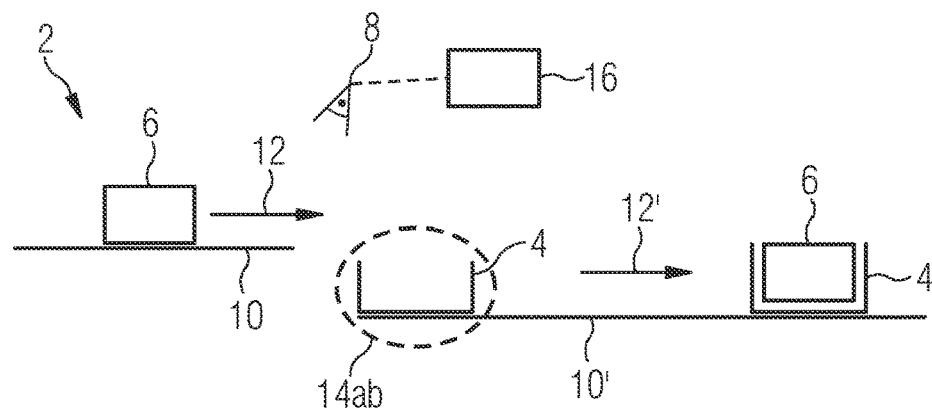
Figure 2:
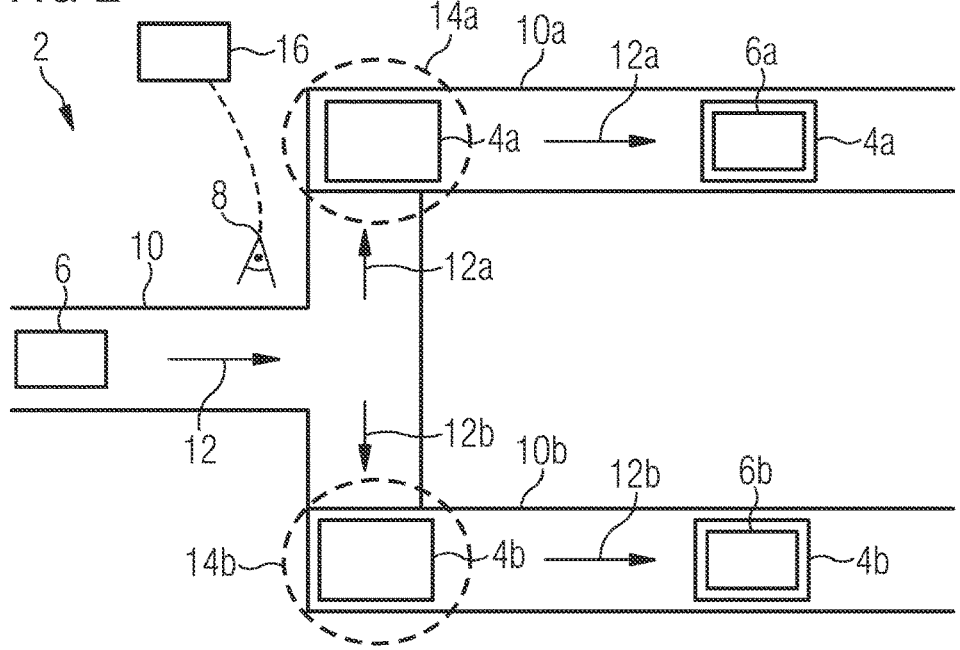
FIG. 2 shows an inventive conveyor system having first and second loading stations for transport containers of the first and second categories respectively.

FIG. 1 shows, according to one embodiment of the invention, an inventive conveyor system 2 having a shared loading station 14ab for transport containers of the first and second categories 4a, 4b in plan view (FIG. 1a) and in a side view (FIG. 1b). FIG. 2 shows, according to a further embodiment, an inventive conveyor system 2 having two separate loading stations 14a, 14b: a first loading station 14a for transport containers of the first category 4a and a second loading station 14b for transport containers of the second category 4b.

In both embodiments, firstly the item of baggage 6 is introduced into the conveyor system 2 (at a check-in counter, baggage drop-off, unloading of an airplane or the like) and then transported on a conveying section 10 along a conveying direction 12 into a recording area of at least one sensor 8. The sensor 8 records at least one dimension, preferably all external dimensions, of the item of baggage 6 and transfers them to a background system 16. The background system 16 allocates the item of piece goods to a larger transport container of the first category 4a or to a smaller transport container of the second category 4b on the basis of the recorded dimensions. The item of baggage 6 is then transported to the loading station 14ab, 14a, 14b. The piece goods are split into different categories only after introduction into the conveyor system at the same introduction point. The transport containers 4a, 4b are provided for loading at the loading stations 14ab, 14a, 14b and the transport containers 4a, 4b allocated to an item of piece goods 6 are loaded.

There are various possibilities of identifying the dimensions of an item of baggage 6 and its position by means of one or more sensor(s) 8. Light barriers, as a light curtain solution, arranged next to each other at different intervals (for example 2.5 mm) along the conveying section can be easily implemented. When a suitcase passes through a light curtain, the quantity of blocked light barriers can be recorded at any instant of passage. When this occurs at several instants, a 2D image of the blocked area is produced. If two light curtains rotated about 90 degrees are used, two 2D images are produced. An upper limit for the height, length, width and volume of the suitcase can be derived from this. The sensor 8 can also be a camera and the background system 14 can ascertain the dimensions of the items of baggage 6 on the basis of the acquired mappings. For ascertaining all external dimensions (length, width, height) it is necessary to arrange the sensors 8 above and/or along and/or transversely to a direction of movement 12 of the items of baggage 6. The sensor 8 can also be a simple light barrier and the length of the item of baggage 6 can be calculated in the direction of transportation 12 on the basis of the obscuration time and the transportation speed.

In the case of a shared, category-independent loading station 14ab (FIG. 1) for transport containers of the first and second categories 4a, 4b, each item of piece goods 6 is transported to the shared loading station 14ab—independently of the allocation item of piece goods 6—transport containers 4a, 4b. A transport container of the first category 4a is transported on a first conveying path 12a toward the shared loading station 14ab and a second category 4b is transported on a second conveying path 12b to the shared loading station 14ab. The size of the (larger) transport container of the first category 4a determines the maximum permissible dimensions of a smaller item of piece goods of the second category 6b.

In the case of two separate loading stations of the first and second categories 14a, 14b (FIG. 2) for transport containers of the first and second categories 4a, 4b, each item of piece goods 6 is transported to its loading station 14a, 14b (the allocated category of the transport containers 4a, 4b corresponds to the loading station category 14a, 14b). A transport container of the first category 4a is transported toward the first loading station 14ab on a first conveying path 12a and a transport container of the second category 4b is transported toward the second loading station 14b on a second conveying path 12b. The transport paths of the piece goods 6 of the first and second categories are split, the transport containers of the first and second categories 4a, 4b are loaded at the separate loading stations 14a, 14b and only after loading are the transport paths 12a, 12b of the loaded transport containers 14 merged again (not shown here).

FIG. 1b shows loading of the transport containers 4a, 4b at the shared loading station 14ab from above—the receiving conveying section 10', on which the transport containers 4a, 4b are transported, is below the delivering conveyor belt 10. Loading can take place with a robot-like, separate loading apparatus, configured in the manner of a gripper robot or also simply by arrangement of the transport containers 4a, 4b to the side of and below the upper conveying section 10, meaning that an item of piece goods 6 simply falls into the transport container 6. Loading from the side at the same height as the conveyor sections 10, 10' is not shown separately but is obviously possible of course, just like other types of loading. The transport containers 4 can be transported on lower conveyor belts 10' to their loading station 14ab, 14a, 14b.

The baggage spectrum of a passenger airport typically has a similar variation in the length and width dimensions. The maximum length of an item of baggage is a critical to whether the item of baggage still fits in a smaller transport container of the second (or third, fourth, etc.) category or can only be received by a transport container of the first category. Typically only a very small portion is very long and, similarly, only a very small portion very short. Until now the dimensions of the transport containers 4 at airports for normal baggage 6 have been selected in such a way that they can receive nearly all normal baggage 6. Larger transport containers are used only with bulky baggage, with there being a separate bulky baggage counter, meaning that the bulky baggage is not introduced into the conveyor system 2 at the same location as the normal baggage 6. Since bulky baggage frequently has to be handled carefully (bicycles, other sports baggage, strollers, etc.) these transport containers are loaded manually, or at least with manual assistance.

According to one embodiment, the dimensions of the transport containers of the first and second categories 4a, 4b are selected to receive IATA standard baggage sizes. The transport containers 4a, 4b are configured so they can be stacked and can thus be stored compactly stacked on top of one another in temporary storage (for example, early baggage storage). According to one embodiment, the dimensions and the number of transport containers of different categories 4a, 4b, 4c transport containers of the first and second categories 4a, 4b are selected according to one embodiment depending on the typical baggage spectrum of an airport: if most passengers are traveling with large items of baggage 6, more transport containers of the first category 4a are provided and/or the dimensions of the transport containers of the first and second categories 4a, 4b are adjusted accordingly. The majority of items of baggage 6 (70-80%) should fit into the transport containers of the second category 4b. A transport container of the second category 4b has much smaller dimensions than a transport container of the first category 4a. In this way, much less "empty air" is accumulated in early baggage storage and the capacity of the early baggage storage can be greatly increased. An increase in capacity of 20-40% is already realistic with only two categories of transport container 4a, 4b. The distribution between the transport container categories 4a, 4b and the exact dimensions can be individually determined by the airport as the end customer. More than two categories of transport container 4a, 4b, 4c can also be used for even better utilization of space although this also increases the logistical complexity. All method steps are carried out partially or completely automatically.

The conveying sections 10 are active conveying sections, meaning that the transport containers directly or indirectly resting on them do not have to have their own drive unit.

According to one embodiment, a passive load receiving means 18 is provided. The transport containers 4a, 4b are placed on the load receiving means 18 and transported resting on it along the conveying sections 10 of the conveyor system 2 to their sorting destinations. Using a load receiving means 18 bundles the transport containers 4a, 4b, meaning that the method is even more compact and the capacity of the conveyor system 2 is thus increased. Transport containers 4a, 4b transported one after another and individually require a gap by contrast.

According to one embodiment, transport containers of the third category 4c, which are smaller than or have different dimensions to the transport containers of the second category 4a, are provided. The inventive method is carried out using the transport containers of the first, second and third categories 4a, 4b, 4c. The transport containers 4a, 4b, 4c are dimensioned in order to be adapted to each other in such way that the space on the passive load receiving means 18 is utilized as efficiently as possible. The transport containers 4a, 4b, 4c each have lengths l1, L2, L3 and smaller or equal sized widths B1, B2, B3. Preferably, the first width B1 is substantially at least one multiple of the second width B2 and/or the first length L1 is substantially at least one multiple of the second length L2. Preferably, the third width B3 is smaller than or equal to the second width B2 and the third length L3 is smaller than or equal to the second length L2. Preferably, the first width B1 is substantially at least one multiple of the third width B3 and/or the first length L1 is substantially at least one multiple of the third length L3.

According to one embodiment, the load receiving means 18 are provided with first holding means and the transport containers 4a, 4b, 4c with second holding means. The first holding means are configured for interaction, in particular positive-fit interaction, with the second holding means in that the interacting first and second holding means limit a movement of the transport container 4a, 4b, 4c resting on the passive load receiving means.

The passive load receiving means 18 can be a transport container of the first category 4a. This transport container of the first category 4a can receive a further transport container of the first category 4a or only further transport containers of the second and/or third category 4b, 4c.

FIG. 3 shows, according to one embodiment, transport containers of the first, second and third categories 4a, 4b, 4c. In the schematic view from above, the transport container of the first category 4 can also be a passive load receiving means 18. The lengths L1, L2, L3 and widths B1, B2, B3 of the transport containers 4a, 4b, 4c are coordinated with each other in such a way that two transport containers of the second category 4b and four transport containers of the third category 4c take up the space of one transport container of the first category 4a.

FIG. 4 shows embodiments of the arrangement of transport containers 4b, 4c on a load receiving means 18 with transport containers 4a, 4b, 4c and load receiving means 18 having dimensions that are adapted to each other. Two transport containers of the second category 4b on one load receiving means 18 (FIG. 4a). Two transport containers of the third category 4c and one transport container of the second category 4b on one load receiving means 18 (FIG. 4c). And four transport containers of the third category 4c on one load receiving means 18 (FIG. 4c).

LIST OF REFERENCE CHARACTERS 2 conveyor system
4 transport container
6 item of piece goods
8 sensor
10 conveying section, feed section
12 conveying direction
14 loading station
14a/b first/second loading station
14ab shared loading station 16 background system
18 passive load receiving means
B1, B2, B3 width
L1, L2, L3 length

The invention claimed is:

1. A method for an optimized operation of a conveyor system for piece goods of variable size, wherein the conveyor system is formed with active conveying sections, the method which comprises:
   a) introducing an item of piece goods into the conveyor system at an introduction point, wherein further piece goods can be introduced into the conveyor system at the same introduction point independently of a respective dimension of the item of further piece goods;
   b) providing transport containers of a first category and a second category, each for receiving one item of piece goods respectively, wherein the transport containers of the first category are larger than the transport containers of the second category, and the transport containers are configured to be transported on the same active conveying sections of the conveyor system;
   c) automatically recording at least one dimension of the item of piece goods;
   d) as a function of the at least one dimension of the item of piece goods thus recorded, automatically allocating the item of piece goods to a transport container of the first category or the second category by a background system encompassed by the conveyor system;
   e) transporting the item of piece goods toward a loading station and automatically loading the allocated transport container with the item of piece goods at the loading station;
   f) transporting the transport container loaded with the item of piece goods on an active conveying section towards a sorting destination allocated to the item of piece goods; and
   g) repeating method steps a) through f) for a further item of piece goods; and
   wherein the conveyor system is configured to handle differently dimensioned items of baggage of an airport baggage conveyor system.

2. The method according to claim 1, wherein step c) comprises recording a length of the item of piece goods.

3. The method according to claim 1, which further comprises:
   providing a passive load receiving means which is dimensioned for receiving at least two transport containers, each loaded with at least one item of piece goods; and
   loading the load receiving means with the at least two transport containers; and
   transporting the at least two transport containers on the active conveying section so as to be resting completely or at least partially on the passive load receiving means.

4. The method according to claim 3, wherein the passive load receiving means is a transport container of the first category.

5. The method according to claim 1, wherein the transport container of the first category has a first length and a first width and the transport container of the second category has a second length and a second width, wherein the first length is greater than or equal to the first width and the second length is greater than or equal to the second width, and the first length is greater than or equal to the second length, and the first width is greater than or equal to the second width.

6. The method according to claim 5, wherein the first width is substantially at least one multiple of the second width and/or the first length is substantially at least one multiple of the second length.

7. The method according to claim 5, which further comprises:
   providing transport containers of a further, third category, the transport containers of the third category being smaller than the transport containers of the first category and smaller than or having different dimensions than the transport containers of the second category; and
   carrying out the method steps using the transport containers of the third category.

8. The method according to claim 7, wherein the transport container of the third category has a third width and a third length, wherein the third width is smaller than or equal to the second width, and the third length is smaller than or equal to the second length.

9. The method according to claim 8, wherein the first width is substantially at least one multiple of the third width and/or the first length is substantially at least one multiple of the third length.

10. The method according to claim 3, wherein the passive load receiving means include first holding means and the transport containers include second holding means configured to engage with the first holding means, and wherein an interaction between the first and second holding means limits a movement of the transport container resting on the passive load receiving means.

11. The method according to claim 1, which comprises:
    loading a transport container depending on a category thereof at a loading station of a corresponding category, wherein the loading stations of different categories do not match;
    or
    loading a transport container independently of a category thereof at a shared loading station, and feeding the allocated transport container toward the shared loading station beforehand.

12. The method according to claim 1, which comprises temporarily storing the transport containers in temporary storage of the conveyor system.

13. A conveyor system for piece goods of variable size in transport containers, the conveyor system comprising:
    at least one introduction point for introducing piece goods independently of dimensions thereof into the conveyor system;
    transport containers of a first category and a second category configured for receiving an item of piece goods respectively, wherein said transport containers of the first category are larger than said transport containers of the second category;
    active conveying sections for transporting said transport containers of the first and second categories, wherein said transport containers are configured to be transported on the same active conveying sections of the conveyor system;
    a recording unit for automatically recording at least one dimension of an item of piece goods;
    a background system for automatically allocating the item of piece goods to a respective transport container of the first or second category as a function of the dimension of the item of piece goods;
    a loading station for automatically loading said transport container allocated by said background system with the item of piece goods; and
    said active conveying sections being configured for transporting said transport container loaded with the item of piece goods toward a sorting destination allocated to the item of piece goods; and the conveyor system being configured to handle differently dimensioned items of baggage of an airport baggage conveyor system.

14. The conveyor system according to claim 13, further comprising passive load receiving means dimensioned for receiving at least two said transport containers, each loaded with at least one item of piece goods, with said passive load receiving means being configured to be transported resting on said active conveying sections, and wherein said passive load receiving means may be a transport container of the first category.

15. The conveyor system according to claim 13, further comprising loading stations for loading said transport containers with piece goods, said loading stations being separate loading stations for each category of transport container, and wherein said loading stations of different categories are different and do not match.

16. The conveyor system according to claim 13, further comprising at least one loading station for loading said transport containers with piece goods, wherein said at least one loading station is a shared loading station for transport containers of each category.

17. The conveyor system according to claim 13, further comprising transport containers of a third category and wherein:

said transport containers of the first category have a first length and a first width, and said transport containers of the second category have a second length and a second width, and said transport containers of the third category have a third length and a third width;

the first length is greater than or equal to the first width, the second length is greater than or equal to the second width, and the third length is greater than or equal to the third width;

the first length is greater than or equal to the second length, and the first width is greater than or equal to the second width, and the third width is smaller than or equal to the second width, and the third length is smaller than or equal to the second length.

18. The conveyor system according to claim 17, wherein the first width is substantially at least one multiple of the second width and/or the first length is substantially at least one multiple of the second length and the first width is substantially at least one multiple of the third width and/or the first length is substantially at least one multiple of the third length.

19. The conveyor system according to claim 14, wherein said passive load receiving means include first holding means and said transport containers include second holding means, wherein said first holding means are configured for interaction with said second holding means, and the interaction between the first and second holding means is configured to limit a movement of said transport containers resting on said passive load receiving means.

* * * * *